(12) United States Patent  (10) Patent No.: US 6,250,256 B1
Lin                         (45) Date of Patent:     Jun. 26, 2001

(54) UNIVERSAL JOINT OF LEASH FOR DOGS

(75) Inventor: Fu-Chern Lin, Changhua (TW)

(73) Assignee: Ming Chiao Ent. Co., Ltd., Changhua (TW)

( * ) Notice: Subject to any disclaimer, the term of this patent is extended or adjusted under 35 U.S.C. 154(b) by 0 days.

(21) Appl. No.: 09/498,470

(22) Filed: Feb. 4, 2000

(51) Int. Cl.[7] .............................. A01K 27/00; F16C 11/00
(52) U.S. Cl. ............................ 119/795; 403/122; 119/769
(58) Field of Search .................................. 119/769, 787, 119/791, 792, 793, 795, 798; 403/122, 124

(56) References Cited

U.S. PATENT DOCUMENTS

| | | | |
|---|---|---|---|
| 4,488,511 | * 12/1984 | Grassano | 119/798 |
| 4,980,805 | * 12/1990 | Maglica et al. | 403/122 |
| 5,672,024 | * 9/1997 | Muaghan et al. | 403/122 |
| 5,758,986 | * 6/1998 | Kraps | 403/122 |
| 5,852,988 | * 12/1998 | Gish | 119/795 |
| 5,901,668 | * 5/1999 | Goodger, Sr. | 119/795 |

* cited by examiner

*Primary Examiner*—Charles T. Jordan
*Assistant Examiner*—Elizabeth Shaw
(74) *Attorney, Agent, or Firm*—Bacon & Thomas, PLLC

(57) ABSTRACT

An improved universal joint for use on a leash for dogs is provided with a hook element, a rotary connector, a retaining tube and a sleeve. The rotary connector has a ball-shaped joint head and an extended engaging rod. The universal joint is fixedly combined with a hook element that is engaged with the retaining tube by way of a pin shaft. The retaining tube has an open end and a semi-open and roundly cornered dome-shaped end having a through hole. The rotary connector is led through the through hole of its engaging rod with the ball-shaped joint head confined in the retaining tube. The engaging rod having a central deep cavity for receiving the front tip of the leash so that the leash and the rotary connector can be punched to fix together. The ball-shaped joint head and the roundly cornered retaining tube permit the rotary connector and the leash to operate smoothly at a wide range of angles so as to effectively avoid abrasion and deformation of the retaining tube and the rotary connector in operation.

1 Claim, 4 Drawing Sheets

UNIVERSAL JOINT OF LEASH FOR DOGS

BACKGROUND OF THE INVENTION

1. Field of the Invention

The present invention relates to a universal joint for use in a leash for dogs. The joint head of the universal joint is of a ball shape and a retaining tube having a chamber provided with dome shaped end for housing the ball-shaped joint head is used so as to make the universal joint operated in a smoother manner, reducing frictional contact in rotation and preventing the roundly cornered chamber from damage of abrasion in use. In addition, the retaining hook will not be outwardly bent at corners. Such a universal joint is operated in wider angles and more smoothly.

2. Prior Art

Referring to FIGS. 1, 2, a first prior art universal joint applied to a leash which is made up of a hook 10, a retaining ring 20 and a leash element 90 is shown. The hook 10 has an extended rod 101 which terminates in an enlarged limiting cylinder 102. The closed retaining ring 20 has a locking element 201 having a round open-ended cavity 202 in which the limiting cylinder 102 is housed. In assembly, the enlarged limiting cylinder 102 is led through the open-ended cavity 202, then the locking element 201 of the retaining ring 20 is punched into an oval shape to rotarily secure the hook 10 to the retaining ring 20.

Such a prior art structure has the following disadvantages:
1. The friction between the locking element 201 and the limiting cylinder 102 is relatively serious, preventing smooth operation of the retaining ring 20 in use when the leash is subject to a strong pull.
2. The open-ended cavity 202 of the retaining ring 20 is easily worn out due to abrasion, resulting in easy detachment of the retaining ring 20 from the enlarged limiting cylinder 102 of the hook 10.
3. When the leash 90 and the retaining ring 20 is not placed in a rectilinear relation, the retaining ring 20 is easily bent, making smooth operation of the retaining ring 20 impossible.

Referring to FIGS. 3, 4, the second prior art is made up of a hook 30, a connector 40, a pair of pins 50, a sleeve 51 and a leash 90. The hook 30 has an engaging section 31 provided with a central round cavity 32 and a pair of symmetric pin holes 33. The connector 40 has an extended rod 41 which is provided with a deep central hole 42 at one end and an enlarged cylinder 43 at the other end. The sleeve 51 has a through hole 511 and a stop flange 512 in the interior and a peripheral groove 513 on the external surface.

The connector 40 is inserted into the sleeve 51 with the enlarged cylinder 43 engaged with the stop flange 512 and the extended rod 41 exposed externally of the through hole 511 in assembly. Then, the sleeve 51 is placed in the central round cavity 32 of the hook 30 with the peripheral groove 513 in line with the pin holes 33 so that the sleeve 51 can be retained in place in the central round cavity 32 of the hook 30, as shown in FIG. 4. In such a manner the connector 40 is safely and rotarily engaged with the sleeve 51. At last, the frontmost end of the leash 90 is placed in the central hole 42 and the extended rod 41 is punched to deform for fixing purpose. In common, such a prior art has the same disadvantages as the first one in practical operation.

SUMMARY OF THE INVENTION

Therefore, the primary object of the present invention is to provide a universal joint for use in a leash for dogs. The universal joint has a ball shaped joint head and a retaining tube having a roundly cornered chamber terminating in a dome-shaped end, that are smoothly engaged with each other so that the universal joint subject to a pull of a dog can be smoothly spun with less friction and abrasion and without producing bending of corners on any parts of the universal joint.

Another object of the present invention is to provide a universal joint for use in a leash for dogs. Such a universal joint is equipped with a ball shaped joint head and a retaining tube having a roundly cornered chamber so as to make the universal joint free of excessive abrasion and the expansion of an opening hole and outward bending of the peripheral edge of the chamber in use. It results in prolonging of the operation span of a leash accordingly.

DETAILED DESCRIPTION OF THE PREFERRED EMBODIMENT

Figure 1:
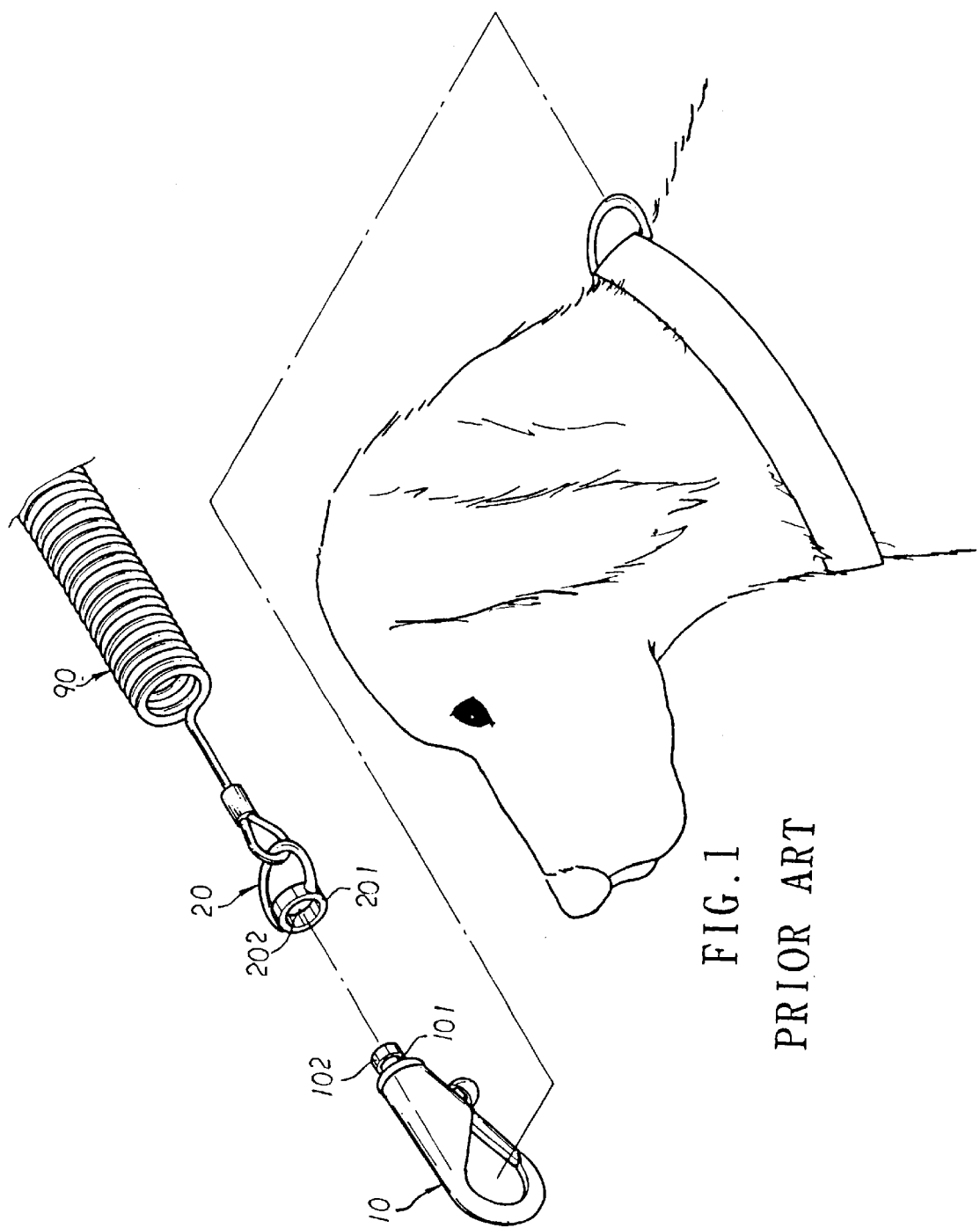
FIG. 1 is a diagram showing the exploded components of a first prior leash assembly.
Figure 2:
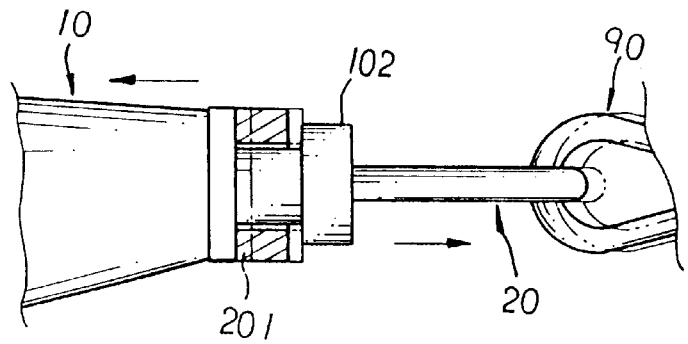
FIG. 2 is a sectional diagram showing the operation mode of the first prior universal joint.
Figure 4:
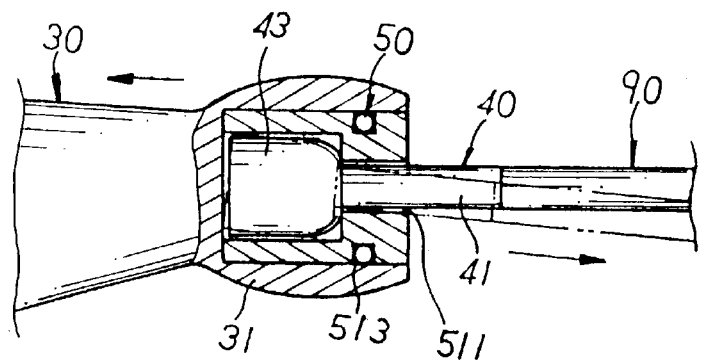
FIG. 4 is a sectional diagram showing the operation mode of the second prior art.
Figure 5:
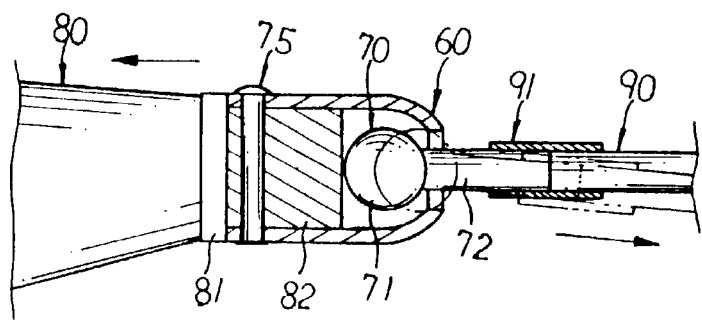
FIG. 5 is a perspective diagram showing the exploded components of the present invention.
Figure 3:
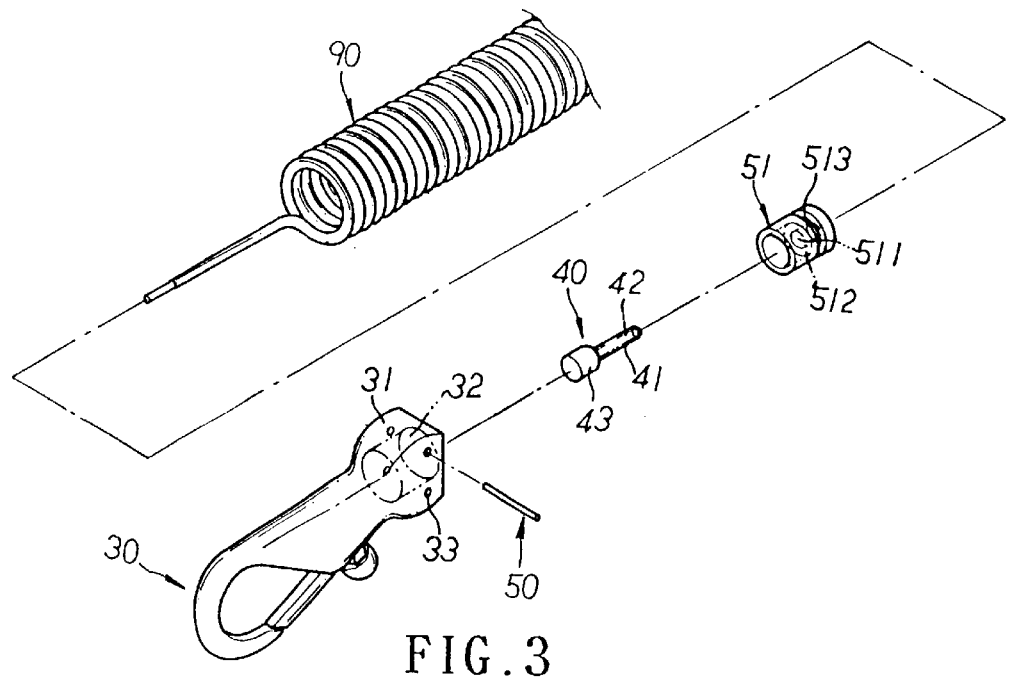
FIG. 3 is a sectional diagram showing a second prior art.

Referring to FIG. 5, the universal joint of the present invention comprises a retaining tube 60, a rotary connector 70, a shaft pin 75, a hook element 80, a leash 90 and a coupling sleeve 91. The retaining tube 60 is provided with an open end and a semi-open end having an approximately dome-shaped contour which has a central through hole 61. Adjacent the open end of the retaining tube 60 are disposed a pair of retaining bores 62 located in linear alignment. The rotary connector 70 has at one end a ball-shaped joint head 71 which has a diameter slightly larger than the diameter of the central through hole 61 of the retaining tube 60 and an extended engaging rod 72 at the other end. The engaging rod 72 has a deep tubular cavity 73.

The hook element 80 has a flanged cylindrical end 82 which is slightly smaller of its diameter than that of the open end of the retaining tube 60 so that the cylindrical end 82 can be engaged with the retaining tube 60. On the cylindrical end 82 is disposed a through hole 83 defined in conformance to the retaining bores 62 of the retaining tube 60.

Figure 6:
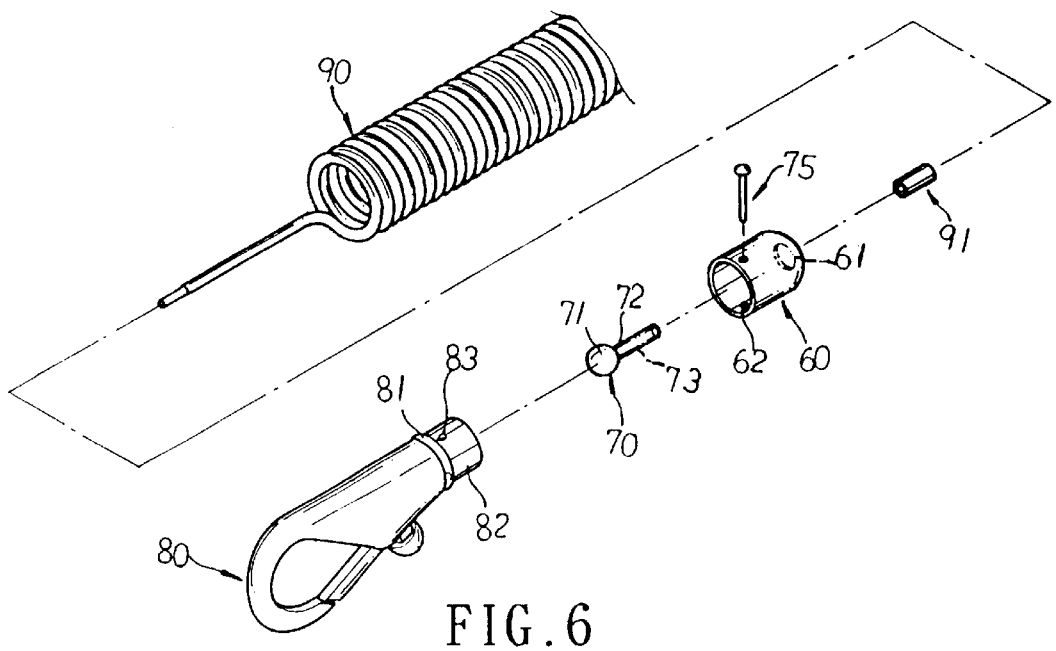
FIG. 6 is a sectional diagram showing the operation mode of the universal joint of the present invention.

In assembly, as shown in FIG. 6, the rotary connector 70 is placed into the retaining tube 60 from the open end with the ball-shaped joint head 71 retained inside the retaining tube 60 at one side of the central hole 61 and the engaging rod 72 stuck out of the central hole 61 at the other end. Then, the hook element 80 is engaged with the retaining tube 60 with the through hole 83 thereof lined in alignment with the retaining bores 62 so that the shaft pin 75 can be riveted to fixedly combine the hook element 80 with the retaining tube 60 to form a rotary connection.

Afterwards, the coupling sleeve 91 has one end engaged with the front portion of the leash 90. Then an frontmost extension of the leash 90 is guided into the deep tubular cavity 73 of the engaging rod 72 of the rotary connector 70 and the engaging rod 72 is punched to secure the leash 90 to the rotary connector 70. Then the coupling sleeve 91 is wrapped around the connection spot of the rotary connector 70 and the leash 90 to complete the assembly.

Figure 7:
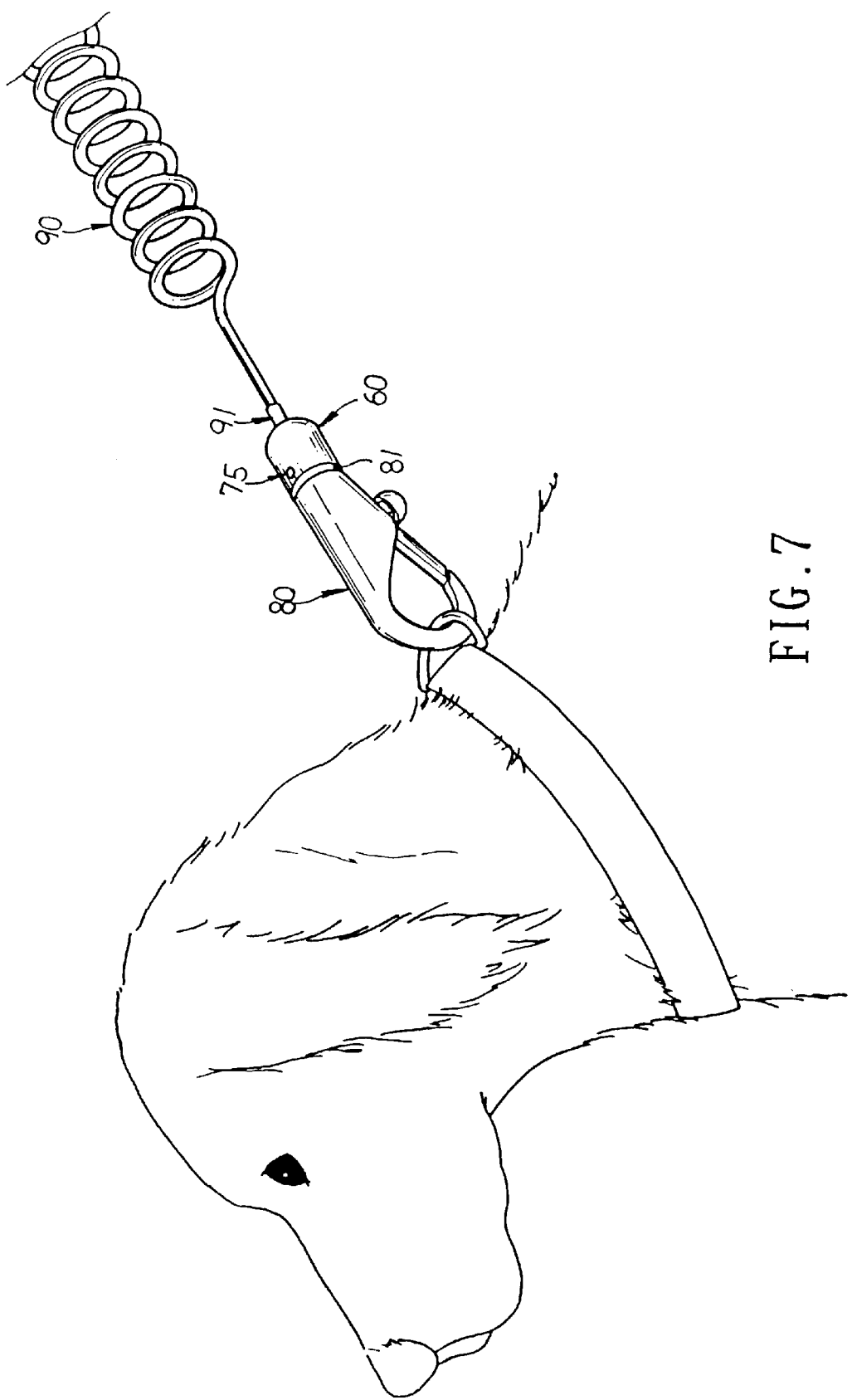
FIG. 7 is a diagram showing the application of the universal joint of the present invention in combination with a leash.

Referring to FIGS. 6 7, when the leash 90 equipped with the universal joint of the present invention is engaged with the ring of a collar of a dog by way of the hook element 80, the ball-shaped joint head 71 is partially exposed via the central through hole 61 of the retaining tube 60 whereby no matter the leash 90 subject to a pull and the rotary connector 70 are positioned in a rectilinear or non-rectilinear relationship, the ball-shaped joint head 71 is always kept in smooth engagement with the central through hole 61.

It can be apparently seen that the present invention has the following advantages:

1. The rotary connector 70 of the universal joint of the present invention and the retaining tube 60 are smoothly engaged with each other with less friction and abrasion in use.
2. The retaining tube 60 is durable in use because of the central through hole 61 is not easily deformed out of abrasion.
3. The joint head 71 of the rotary connector 70 is constantly kept in circular contact with the retaining tube 60, so no bending of corners can be produced regardless of the leash 90 and a dog controlled by the leash 90 being in a rectilinear and non-rectilinear relationship.

I claim:
1. A universal joint of a leash for dogs, comprising:
a retaining tube; a rotary connector; a shaft pin; a hook element; a leash, and a coupling sleeve;
wherein said retaining tube is provided with an open end and a semi-open end having an approximately dome-shaped contour which has a central through hole; adjacent said open end of said retaining tube are disposed a pair of retaining bores located in linear alignment; said rotary connector has at one end a ball-shaped joint head which has a diameter slightly larger than the diameter of said central through hole of the retaining tube and an extended engaging rod at the other end; said engaging rod has a deep tubular cavity; said hook element has a flanged cylindrical end which is slightly smaller of its diameter than that of the open end of said retaining tube so that the cylindrical end can be engaged with the retaining tube; on the cylindrical end is disposed a through hole defined in conformance to said retaining bores of said retaining tube; whereby said rotary connector can be placed into said retaining tube from said open end with said ball-shaped joint head retained in said retaining tube at one side of the central through hole and said engaging rod stuck out of said central through hole at the other end;
then, said hook element is engaged with said retaining tube with the through hole thereof lined in alignment with said retaining bores so that the shaft pin can be riveted to fixedly combine said hook element with said retaining tube to form a rotary connection.

* * * * *